Nov. 28, 1967  J. CRAGGS ET AL  3,355,005
LOADING DEVICE AND METHOD FOR TRANSFER POINTS
Filed April 2, 1965  3 Sheets-Sheet 1
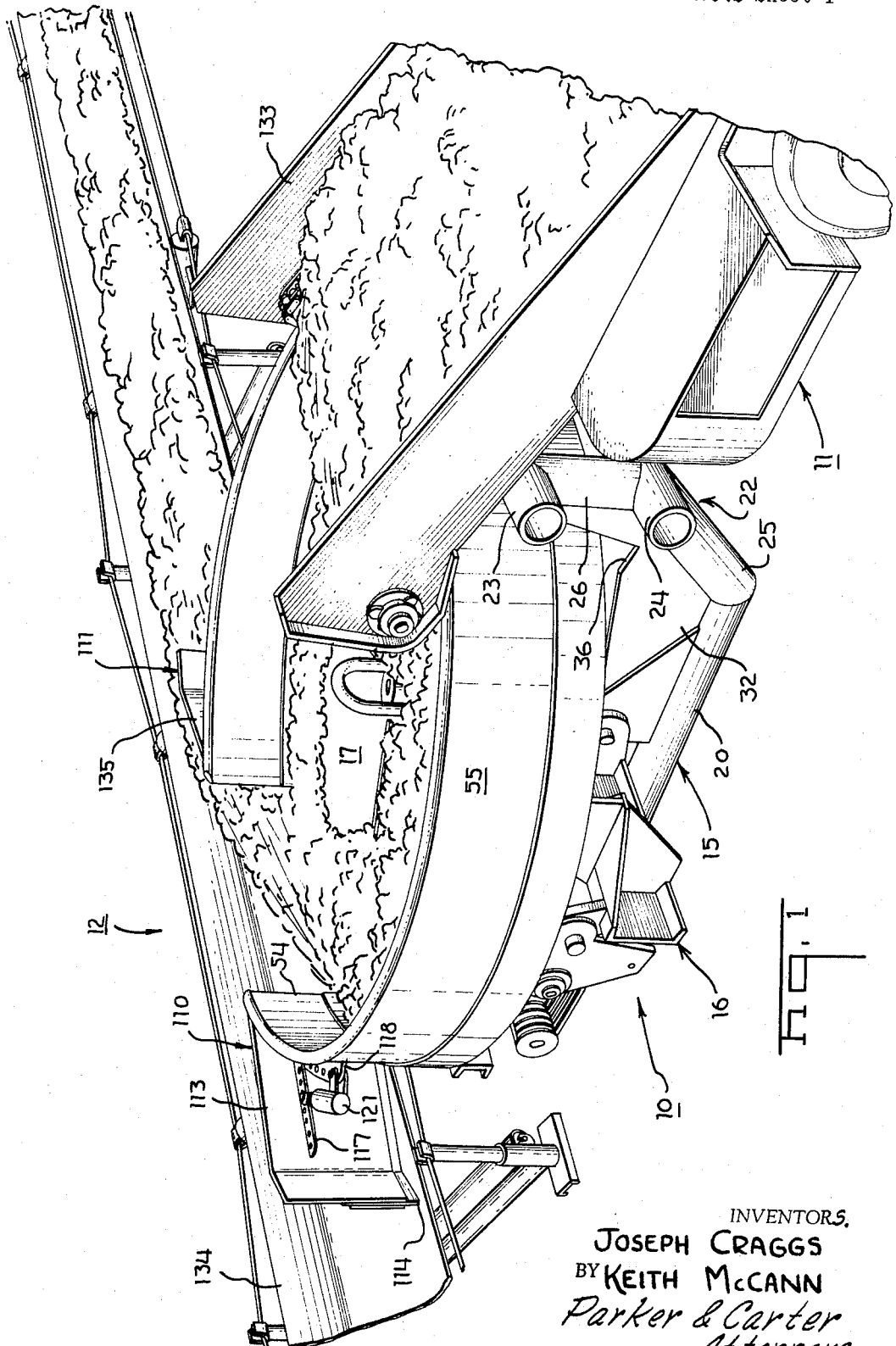
INVENTORS.
JOSEPH CRAGGS
BY KEITH McCANN
Parker & Carter
Attorneys.

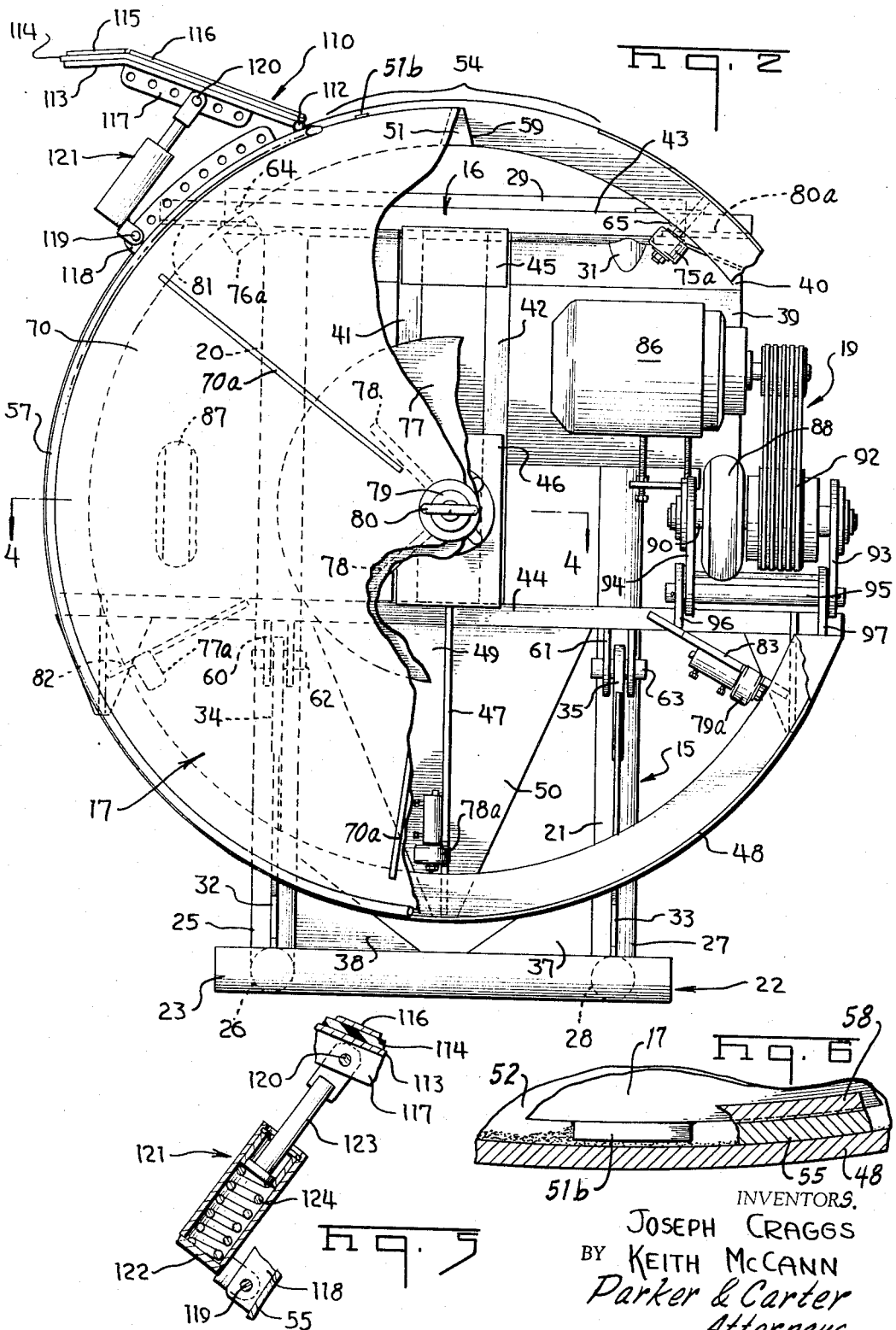

Nov. 28, 1967  J. CRAGGS ET AL  3,355,005
LOADING DEVICE AND METHOD FOR TRANSFER POINTS
Filed April 2, 1965  3 Sheets-Sheet 3
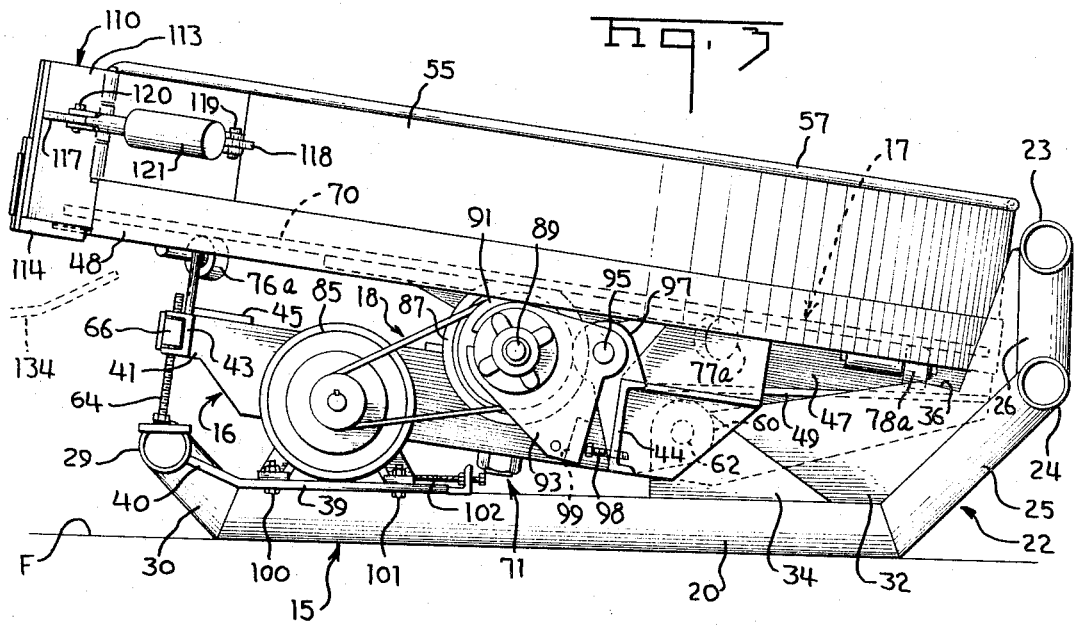
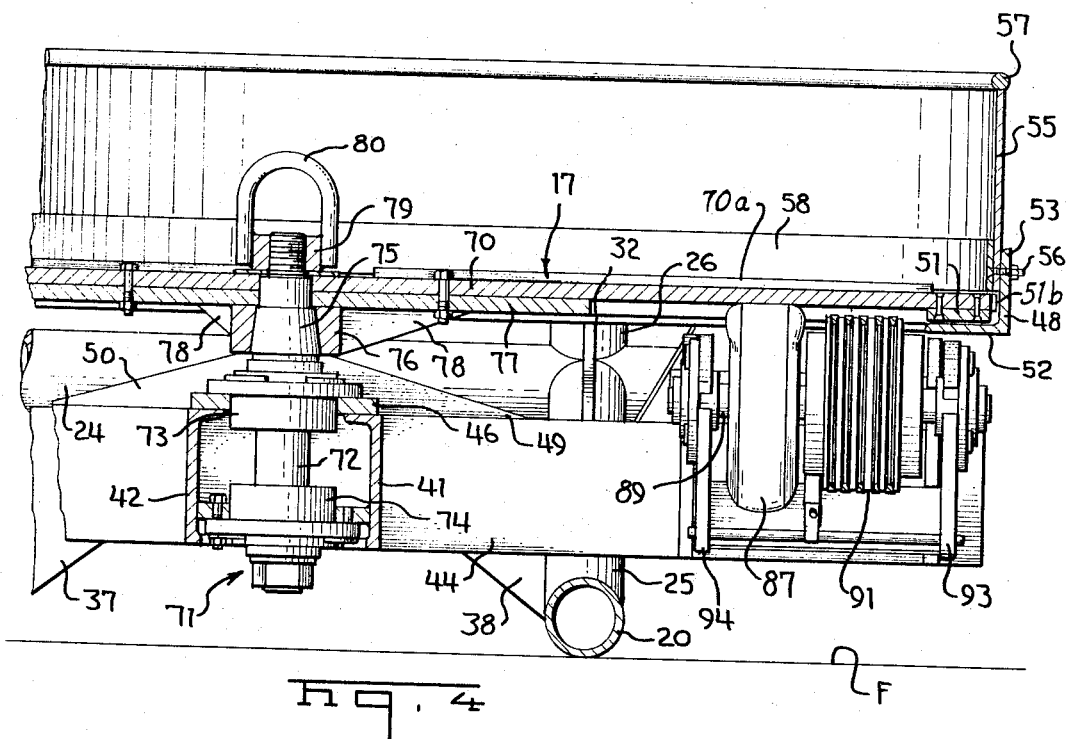
INVENTORS
JOSEPH CRAGGS
BY KEITH McCANN
Parker & Carter
Attorneys.

United States Patent Office 3,355,005
Patented Nov. 28, 1967

3,355,005
LOADING DEVICE AND METHOD FOR
TRANSFER POINTS
Joseph Craggs, Morrisonville, and Keith McCann, Taylorville, Ill., assignors to Goodman Manufacturing Company, Chicago, Ill., a corporation of Illinois
Filed Apr. 2, 1965, Ser. No. 444,966
15 Claims. (Cl. 198—103)

This invention relates to a method and apparatus for feeding surge loads of materials onto a moving belt or other material removal means.

The transfer of batch loads from a carrier, such as a shuttle car, to a fixed material removal means, such as a belt conveyor, is frequently a troublesome problem. This is attributable to several facts, one of the most persistent being the inability of the material removal means to remove the material as fast as it can be discharged from the carrier onto the material removal means. In underground coal mines, for example, shuttle cars are frequently employed to shuttle loads of mined coal from the advancing mining face to a fixed removal conveyor. Shuttle car capacities vary but even the smallest carry several tons of coal and all are capable of discharging in a matter of seconds, or a few minutes at most. Generally the belt conveyors onto which the coal is discharged range in width from 30 inches to 48 inches and run at several hundred feet per minute, but even the wider belts running at the higher speeds can seldom accept the coal as fast as the shuttle car can discharge it. Too rapid transfer onto the belt causes spillage and may even damage the conveyor because of the temporary overload. When the rate of discharge of the shuttle car is slowed to match the removal capacity of the conveyor, the car is tied up too long and the material may be mined, often by a continuous mining machine, at a faster rate than the removal rate of the shuttle cars. The result may be periodic shut down of the mining operation in order to clear away the accumulated pile of mined material behind the miner. Both the mining machine and shuttle car efficiency is reduced.

Accordingly, a primary object of this invention is to provide a method and apparatus for transferring a batch of material onto a material removal means which will not overload the material removal means nor tie up the batch carrier for a period of time longer than the time required by the carrier to discharge at its optimum discharge rate.

Another object is to provide a loading device for transfer points in mining operations in which a batch carrier, such as a shuttle car, discharges onto a material removal means, such as a belt conveyor, whose capacity to accept material is less than the capacity of the shuttle car to discharge material.

Yet a further object is to provide a loading device able to simultaneously accept surge loads and discharge a continuous stream of material at a rate within the capacity of the material removal means onto which the material is deposited.

Yet another object is to provide a loading device as above described having a unique drive system which requires no clutch or overload accommodating mechanism to handle temporary overloads.

Yet another object is to provide a loading device as above described which is very low in height and therefore usable in low headroom environments, such as low seam underground coal mines.

Yet another object is to provide a loading device having a unique system for continuously clearing away the accumulation of fines inherent in any operation handling bulk material, whereby the buildup of fines is eliminated.

Another object is to provide a loading device as above described which employs a friction drive system including relatively inexpensive rubber tires whereby replacement and maintenance requirements due to wear and failures will occur in components which are the least expensive and easiest to replace.

Yet another object is to provide a loading device as above described capable of discharging in either of two directions as required by merely reversing the direction of rotation of the drive motors, thereby eliminating expensive direction changing drive components.

Yet another object is to provide a loading device as above described having means for varying the angle of discharge of material onto a conveyor and maintaining it on the conveyor whereby the angular position of the loading device with respect to the conveyor may be varied to meet environment limitations.

A further object is to provide means for elevating bulk material carried by a rotating surface from a low point to a high point without slippage to thereby provide an efficient transfer rate of material from the rotating surface to the point of deposition.

Other objects and advantages will become apparent upon reading the following description of the invention.

The invention is illustrated more or less diagrammatically in the following figures, wherein:

FIGURE 1 is a perspective view of the loading device in operation;

FIGURE 2 is a top plan view with portions broken away for clarity and others shown in dotted lines;

FIGURE 3 is a side elevation;

FIGURE 4 is a section taken substantially along the line 4—4 of FIGURE 2;

FIGURE 5 is a detail view to an enlarged scale of the cushioning mechanism associated with the direction establishing mechanism; and FIGURE 6 is a top, detail view to an enlarged scale which illustrates means for preventing build-up of material between the disc and the hopper.

Like reference numerals will be used to refer to like parts throughout the following description of the figures.

The loading device is indicated generally at 10 in FIGURE 1. It is shown receiving a load from a shuttle car 11 and simultaneously discharging the load onto belt conveyor 12. It will be understood that the material removal means may vary widely within the scope of the invention. The invention is, however, particularly applicable to employment with a belt conveyor which is a well known form of a substantially unidirectional material removal means. In this instance a conveyor of the type illustrated in the Craggs et al. patent, 2,773,257, has been shown for purposes of illustration.

The loading device includes a sub-frame 15, a pivot or tilting frame 16, a turntable assembly 17, and driving means 18, 19.

Sub-frame 15, shown best in FIGURES 2 and 3, includes a pair of main frame members 20, 21 which rest upon the floor F. A rear bumper frame is indicated generally at 22, the bumper frame including transversely extending tubular members 23, 24, and upwardly extending members 25, 26, 27, 28. The forward end of the sub-frame is formed by a transverse member 29 which is welded to a pair of upstanding struts 30, 31, shown best in FIGURES 2 and 3.

A pair of vertically oriented reinforcing plates are indicated at 32, 33. These plates are welded along their rear edges to bumper frame members 25, 26, and 27, 28, respectively. Each reinforcing plate is welded along its leading edges to bottom members 20, 21, and generally triangularly shaped pivot blocks 34, 35. The plates are cut away as indicated at 36 to prevent interference with the turntable assembly 17. A pair of interior, generally triangularly shaped reinforcing members are indicated at 37 and 38.

A platform, shown best in FIGURE 2, is indicated at 39, said platform having a forward, upturned portion 40, whose leading edge is welded to transverse member 29. As best seen in FIGURE 2, the side edges of the platform extend outwardly beyond the longitudinal members 20, 21, for a purpose which will appear hereinafter.

The pivot or tilting frame 16 consists essentially of a pair of longitudinal stringers 41, 42, which, in this instance, are merely channel members disposed with their short side flanges facing one another. Stringers 41, 42 are welded at their forward ends to a transverse channel 43, and at their rearward ends to a second transverse channel 44. A pair of spacing and reinforcing plates are indicated at 45 and 46. A centrally positioned rearwardly extending brace is indicated at 47, this brace being welded at its forward edge to channel 44 and at its rearward edge to the underside of an L-shaped support ring 48, shown best in FIGURES 2 and 4. A pair of triangular reinforcing braces are indicated at 49, 50, these braces being welded to the cross channel 44 and rearwardly extending brace 47.

The lower, horizontally disposed portion 52 of the support ring 48 is peripherally continuous, but the upper, vertically disposed portion 53 is cut away as indicated at 54 in FIGURE 2. A wall structure is indicated at 55, the wall consisting essentially of a bent plate, or plates, secured by fasteners 56 to the upwardly extending portion 53 of support ring 48. A beaded edge 57 is formed about the upper periphery of wall 55 to provide a smooth edge and reduce the danger of deformation due to impact of material from above. A liner or shock ring is indicated at 58, this ring consisting essentially of replaceable sheet material which is secured to the lower end of wall 55 by fasteners 56. As best seen in FIGURE 4, liner 58 overhangs, that is, extends inwardly from, the outermost periphery of the turntable assembly 17 as will be discussed in detail hereinafter. For installations where sparking may be a problem, the liner 58 may be made of non-sparking material such as bronze or Everdur. Alternately, the lower edge of liner 58 which overlies plate 70 may be so made.

A plurality of wedge shaped members, one of which is indicated at 51, are bolted to the underside of plate 70 about its periphery. Each member has inclined edges, indicated at 59. Wedges 51 closely overlie the inwardly extending portion 52 of supporting ring 48 and function to sweep along the fines which tend to collect in ring 48. It will be apparent that fines will, of necessity, sift through the clearance space between the top of plate 70 and the bottom of overhanging bumper plate 58, and these fines must be removed. When the wedges reach aperture area 54, the fines will drop onto the conveyor belt 134.

A plurality of peripheral extension members, one of which is indicated at 51b in FIGURE 6, are welded or otherwise suitably secured to the peripheral edge of plate 70. These peripheral extension members further prevent the build-up of material between the plate 70 and the hopper and thereby eliminate any braking effect. A clearance between the radial extremity of members 51b and ring 48 on the order of ⅛" will give very effective results.

Two pairs of pivot brackets, shown best in FIGURES 2 and 3, are indicated at 60 and 61, the pivot brackets being welded at their leading edge to transverse channel 44. A pair of pivot pins 62, 63, pivotally connect the tilting frame 16 to the pivot blocks 34, 35 of sub-frame 15. Relative pivoting movement between the two frames is provided by a pair of jack screws 64, 65 which are received in threaded blocks 66 carried by transverse member 43. By rotating jack screws 64, 65 the tilting frame 16 and all components carried by it can be rotated about pivot pins 62 and 63 with respect to sub-frame 15.

Turntable assembly 17 consists essentially of a flat plate 70 which is carried by the supporting structure indicated generally at 71. Said supporting structure includes a shaft 72 which is journaled in bearings 73, 74. The upper end of the shaft is tapered, as at 75, for the reception of a collar 76 which is welded to a circular reinforcing plate 77. The reinforcing plate is bolted to plate 70 and a plurality of triangular braces 78 provide additional support. A nut 79 to which a U-shaped lifting eye 80 is welded is carried by the upper end of the shaft. The lifting eye 80 also functions to protect the shaft from the impact of material loaded or dumped onto plate 70. A plurality of narrow, generally radially disposed paddles are indicated at 70a for a purpose which will appear hereinafter.

Turntable 17 is supported from the tilting frame 16 at a plurality of locations about its periphery. In this instance, five support rollers 75a, 76a, 77a, 78a, 79a, have been illustrated. Each roller is at least partially supported by a mounting brace, four of the mounting braces being indicated at 80a, 81, 82, 83, respectively. Rollers 75a and 76a are further supported for example, by support ring 48. In this instance roller 78a has been supported from rearwardly extending brace 47. Each roller is here shown as mounted on a shaft which is slidably received in a sleeve, the sleeve in turn being welded to the associated mounting brace structure. The radial, and to a slight extent the vertical, position of the rollers may be varied by adjustment of the bolts which secure the roller shafts to the mounting sleeves.

The drive system 18, 19 consists essentially of a pair of motors 85, 86, each of which drives a small rubber tire 87, 88, respectively. Each rubber tire is mounted on a shaft, indicated at 89, 90, and each shaft carries a driven pulley 91, 92. The drive is preferably by means of belts for a purpose which will shortly appear.

The motors 85 and 86 are preferably mounted to plate 39 by bolts 100, 101 which pass through adjustment slots in plate 39. An adjustment screw 102 will maintain the motors fixed with respect to the sub-frame 15.

Wheel shafts 89, 90 are each carried by a pivot structure which is illustrated best in FIGURES 2 and 3. Since the pivot structures are substantially identical, like reference numerals will be used to refer to corresponding parts from structure to structure.

Referring particularly to FIGURES 2 and 3, each pivot structure includes a pair of pivot plates 93, 94, said plates being generally triangularly shaped. The shafts 89 or 90 are mounted in aligned apertures located in the forward ends of the plates. A pivot pin 95 connects each pair of pivot plates to a pair of pivot support brackets 96, 97, the pivot support brackets in turn being welded to the transverse brace member 44.

Adjustment means for the pivot structure is indicated best in FIGURE 3. The adjustment means consists essentially of an adjustment screw 98 whose head end abuts a cross-brace 99 which is secured at its ends to the swinging pivot plates 93, 94, and whose shank is threaded into transverse channel 44.

Structure for directing the flow of material discharged from the turntable assembly is illustrated best in FIGURES 1, 2, 3 and 5. Such structure includes a pair of flaps 110, 111, each of which is pivotally connected to the wall 55 by a hinge pin, one of which is indicated at 112. The construction of the flaps may vary widely. In the illustrated embodiment each flap consists essentially of a bent plate 113 to which a rubber or other flexible deflector 114 is secured by upwardly disposed clamping members 115, 116 shown best in FIGURES 2 and 5. An adjustment plate 117 is welded to and extends outwardly from the rear face of plate 113. A similar adjustment plate 118 is welded to the outside of wall 55. Each plate carries a plurality of apertures of a size suitable to receive pivot pins 119, 120. The pins are carried by the cylinder and piston, respectively, of an extensible cushioning cylinder 121. As best shown in FIGURE 5, the cushioning cylinder consists essentially of a housing having a closed end 122, a piston-like member 123 extending outwardly from the other end of the housing, and a spring 124 interposed between the closed end of the housing and the expanded end of the piston-like member. As is best seen from FIGURE 5 an impact against plate assembly 110 will depress the plunger against the spring 124. After removal of the impact, the spring will return the plunger to the illustrated FIGURE 5 position. The nominal angular position of the plate assembly 110 with respect to the side wall 55 and the hardness or softness of the cushioning effect may be varied by suitable placement of the cushioning assembly in the holes formed in plates 117 and 118.

The use and operation of the invention is as follows:

As the shuttle car 11 approaches the bumper frame 22 of the loading device, the discharge end 133 of the car is elevated by mechanism well known in the art to clear the upper edge of the inclined wall 55. The shuttle car operator then discharges the load onto the rotating turntable assembly 17. The centrifugal force imparted to the material deposited on the turntable causes the material to move radially outwardly from shaft 72, and, of course, the linear speed of the material increases as the material moves towards the periphery of plate 70. The paddles 70a are important to efficient operation because they substantially eliminate any slippage of material with respect to the plate 70. The greater the angle of tilt of the turntable assembly 17 about pivot pins 62, 63, the more important the paddles become. Three paddles spaced 120° apart, each being about ¾" high by ¾" wide have given excellent results but it is contemplated a greater or lesser number may be employed depending on operating conditions. Preferably, the speed of rotation of the plate 70 is such that the peripheral speed of the plate is approximately equal to the lineal speed of the belt 134 of belt conveyor 12. When the material reaches the opening 54 formed in side wall 55, it moves outwardly onto the belt by reason of the centrifugal force resulting from rotation of turntable 70, the direction of movement of the material as it leaves the turntable assembly being substantially tangential with respect to it. Deflector assembly 111 prevents material from dropping off the conveyor, since it is preferably adjusted so that its outermost point 135 is spaced inwardly several inches from the edge of the conveyor belt 134. In effect, the deflector assembly 111 insures deposition of the material onto the center area of the moving belt.

The jack screws 64, 65 tilt the tilting or pivot frame assembly 16, and thereby the turntable assembly 17, about pivot pins 62, 63. Tilting of the structure enables the discharge end of the device to overlie the conveyor, as indicated best in FIGURE 3. Simultaneously, the loading end of the device is depressed so that the discharge end 133 of the shuttle car need be elevated only a minimum distance.

Drive wheels 87 and 88 are located on opposite sides of shaft 72 and rotate in opposite directions. Their net effect is to cause the turntable assembly to rotate, in this instance in a clockwise direction, as viewed in FIGURE 2. The coefficient of friction between the wheels and the undersurface of plate 70 may be varied by adjustment of screw 98. If pneumatic tires are employed, and such tires are preferred, further adjustment of the coefficient of friction can be made by increasing and decreasing the air pressure in the tire. The drive system is of course of a size capable of rotating the turntable assembly at a rate consonant with the capacity of the material removal means to accept material without undesirable spillage.

In order to accommodate different angles of tilt of the tilting frame 16 with respect to the sub-frame 15, adjustment means 102 permits appropriate movement of the motors 85 or 86 to the proper tension position.

The turntable may be continuously or intermittently operated. Preferably, the turntable is rotating at the time material is deposited on it so that the loading device simultaneously discharges a continuous stream of material while it is receiving incoming material. Wall 55 provides, in effect, a storage hopper which enables the device to be loaded at a faster rate than it is discharged. In this manner the shuttle car may be run up to the loading device, quickly discharge its contents, and then begin the return trip to the mining operation without waiting for all of the load it carried to be placed on the conveyor belt 134. Rates of rotation of from 60 to 75 r.p.m. have proven quite satisfactory.

Wedge members 51 and peripheral extension members 51b sweep out the fines and other materials which otherwise would collect between the edge of the turntable assembly and ring 48, and thereby eliminate any braking effect attributable to build-up of fines in this area.

Although a preferred embodiment of the invention has been illustrated and disclosed, it will at once be apparent to those skilled in the art that various modifications may be made within the spirit of the invention. Accordingly, it is intended that the scope of the invention be limited not by the foregoing exemplary description, but solely by the scope of the hereinafter appended claims, when interpreted in light of the pertinent prior art.

We claim:

1. A device for transferring surge loads of particulate type material to substantially unidirectional material removal means, said device including in combination with
substantially unidirectional material removal means
a turntable assembly and supporting structure therefor,
drive means operable to rotate said turntable assembly at a rate consonant with the capacity of the material removal means to accept material without undesirable spillage,
means for directing material carried near the edge portion of the turntable assembly and discharge therefrom under the impetus of movement imparted by the turntable assembly along a substantially tangential path with respect to the periphery of the turntable assembly, and positioned to discharge the material to the material removal means which is adjacent said turntable assembly,
said material directing means including a wall structure formed about only a portion of the edge of the turntable assembly,
said wall structure forming a discharge exit in the area of tangency of the path of the discharged material from the turntable assembly,
said wall structure further forming an upwardly open loading area above the turntable assembly which enables surge loads to be deposited into the turntable assembly at any point from the center to the edge portion thereof and,
means for orienting the turntable assembly in a position in which that portion of the edge of the turntable assembly in which the tangential discharge exit is formed may be at an elevation above the level of the material removal means whilst a portion of the device remote from the tangential discharge exit may be below the level of the material removal means.

2. The device of claim 1 further characterized in that the turntable assembly is tiltable about an axis which is generally parallel to the line of tangency of the turntable assembly taken at the discharge exit.

3. The device of claim 2 further characterized in that the edge of the turntable assembly in the discharge exit may be disposed in vertical alignment with the material removal means.

4. The device of claim 1 further characterized in that the drive means includes rubber wheel means in frictional driving engagement with the undersurface of the turntable assembly.

5. The device of claim 1 further characterized in that said drive means includes rubber wheel means in driving engagement with the turntable assembly,
structure for directing material carried by the turntable along a substantially tangential discharge path extending from the turntable, and
structure for tilting the turntable assembly about an axis substantially parallel to the substantially tangential discharge path.

6. The device of claim 5 further characterized in that the structure for tilting the turntable assembly includes a sub-frame, and
pivot means for varying the angle of the turntable assembly with respect to the sub-frame.

7. The device of claim 5 further characterized in that the rubber wheel means are disposed in frictional driving engagement with the undersurface of the turntable assembly, and further including
means for varying the pressure of the rubber wheel means against the underside of the turntable assembly.

8. The device of claim 7 further characterized in that the rubber wheel means includes a plurality of pneumatic tires.

9. The device of claim 8 further characterized in that the pneumatic tires are pivotally mounted on a turntable assembly supporting structure to thereby enable said tires to be pressed into engagement with the turntable assembly.

10. The device of claim 9 further characterized in that the drive means includes
motor means carried by a sub-frame,
said tires being movably mounted with respect to the motor means whereby the tires may be maintained in frictional driving engagement with the turntable assembly as the position of the turntable assembly is varied with respect to the sub-frame.

11. The device of claim 1 further including
means for tilting the turntable assembly with respect to its supporting structure to a position in which the material discharge means is located at the region of the highest elevation of the turntable assembly, and
means for reducing gravital slippage of the material with respect to the turntable assembly as said turntable assembly elevates the material carried thereon to the discharge means,
said slippage reducing means comprising a plurality of generally radially oriented members which extend upwardly from the upper surface of the turntable assembly only a distance sufficient to prevent gravital slippage of the material on the turntable assembly surface without substantially hindering or directing discharging movement of the material outwardly therefrom.

12. A device for transferring loads to a belt conveyor at a material transfer point, said device including, in combination,
a turntable constructed and arranged to receive impact loads deposited thereon,
a pivot frame supporting the turntable,
said pivot frame carrying bearing means for rotatably supporting the turntable,
a sub-frame,
pivot means connecting the pivot frame to the sub-frame to provide relative pivotal movement between the frames whereby the angle of inclination of the pivot frame, and thereby the turntable, may be varied,
drive means for rotating the turntable, said drive means including a rubber tire pivotally mounted on the pivot frame and means for urging it into frictional, driving engagement with the underside of the turntable,
motor means driving the rubber tire, and
a side wall extending upwardly from the pivot frame about the periphery of the turntable, said side wall having an opening therein forming a discharge aperture for the discharge of material from the turntable, said side wall extending upwardly a distance sufficient to form a reservoir of a size which can accept surge loads of a size greater than the capacity of an associated conveyor to instantly remove.

13. The device of claim 12 further characterized in that the rubber tire is located at a point on the radius of the turntable at which the path of movement of the turntable as it passes over the tire is substantially coincident with the axial center line of the area of contact between the turntable and wheel.

14. In a transfer device having a turntable assembly which rotates with respect to a wall structure which extends upwardly from the turntable assembly about a substantial portion, less than all, of its periphery, the improvement comprising
means for preventing build-up of fines between the edge of the turntable assembly and the wall structure,
said means comprising a plurality of sweeper members carried by the peripheral portion of the turntable assembly which cause fine materials between the turntable assembly and the wall structure to be discharged at the discontinuous portion of the wall structure.

15. The combination of claim 14 further characterized in that at least a portion of said sweeper members are carried by and extend radially outwardly from the edge of the turntable assembly.

References Cited
UNITED STATES PATENTS

| | | | |
|---|---|---|---|
| 858,218 | 6/1907 | Rosenvall | 198—6 |
| 1,489,926 | 4/1924 | Burtchaell | 198—25 |
| 1,806,110 | 5/1931 | Menke et al. | 198—128 X |
| 2,701,137 | 2/1955 | Hoffmeister | 272—46 |
| 2,780,460 | 2/1957 | Eyerly | 272—36 |
| 2,805,061 | 9/1957 | Clark | 272—36 X |
| 2,978,069 | 4/1961 | Shoffner | 198—103 X |
| 2,989,308 | 6/1961 | Diehl | 272—48 X |
| 3,049,215 | 8/1962 | Hutter et al. | 198—103 X |
| 3,140,092 | 7/1964 | Hrubetz | 272—36 |

FOREIGN PATENTS

| | | |
|---|---|---|
| 266,292 | 7/1927 | Great Britain. |
| 277,633 | 11/1927 | Great Britain. |

EVON C. BLUNK, *Primary Examiner.*

ANDRES H. NIELSEN, *Examiner.*

M. L. AJEMAN, *Assistant Examiner.*